United States Patent
Jayaraman et al.

(10) Patent No.: US 8,743,871 B2
(45) Date of Patent: Jun. 3, 2014

(54) MEDIA IDENTIFICATION, CLASSIFICATION, FORWARDING, AND MANAGEMENT FOR VOICE AND VIDEO COMMUNICATIONS

(75) Inventors: Prakash Jayaraman, Fremont, CA (US); Raj Bhatia, Eatontown, NJ (US)

(73) Assignee: Network Equipment Technologies, Inc., Fremont, CA (US)

( * ) Notice: Subject to any disclaimer, the term of this patent is extended or adjusted under 35 U.S.C. 154(b) by 42 days.

(21) Appl. No.: 13/538,870

(22) Filed: Jun. 29, 2012

(65) Prior Publication Data

US 2013/0163584 A1 Jun. 27, 2013

Related U.S. Application Data

(60) Provisional application No. 61/571,776, filed on Jun. 30, 2011.

(51) Int. Cl.
*H04L 12/66* (2006.01)
*H04L 29/06* (2006.01)
*H04M 7/00* (2006.01)

(52) U.S. Cl.
CPC ......... *H04L 29/06027* (2013.01); *H04M 7/006* (2013.01); *H04L 29/06326* (2013.01)
USPC .......................................... 370/352; 370/401

(58) Field of Classification Search
CPC .................. H04L 29/06027; H04L 29/06326; H04M 7/006
USPC .......... 370/252, 236, 477, 352, 401; 455/557, 455/422
See application file for complete search history.

(56) References Cited

U.S. PATENT DOCUMENTS

| | | | | |
|---|---|---|---|---|
| 6,829,249 B1 * | 12/2004 | Ray et al. | ....................... | 370/466 |
| 7,035,230 B1 * | 4/2006 | Shaffer et al. | ................. | 370/261 |
| 7,213,050 B1 * | 5/2007 | Shaffer et | ..................... | 709/204 |
| 7,307,980 B1 * | 12/2007 | Shah | ............................. | 370/352 |
| 7,369,502 B2 * | 5/2008 | Ganesamoorthi et al. | ..... | 370/236 |
| 8,045,480 B2 * | 10/2011 | Ganesamoorthi et al. | ..... | 370/252 |
| 2007/0064677 A1 * | 3/2007 | Xiong | ........................... | 370/352 |
| 2008/0008312 A1 * | 1/2008 | Ganesamoorthi et al. | ....................... | 379/399.02 |
| 2008/0159524 A1 * | 7/2008 | Ganesamoorthi et al. | ....................... | 379/399.02 |
| 2011/0032927 A1 * | 2/2011 | Chen et al. | .................... | 370/352 |
| 2012/0033661 A1 * | 2/2012 | Knappe | ........................ | 370/352 |

* cited by examiner

*Primary Examiner* — Chuong T Ho
(74) *Attorney, Agent, or Firm* — Straub & Pokotylo; Michael P. Straub; Stephen T. Straub (57) ABSTRACT

A system processes media, such as voice and video, in a scalable and secure manner. The system can process voice and video for a large quantity of users. For example, the system can enable large quantities of simultaneous phone conversations over an IP network. The IP network can carry voice, video, and other data concurrently. The system identifies which packets carry voice data, which packets carry video, and which packets carry other kinds of data. The system scales both with the quantity of users and in terms of network topology. Multiple digital signal processors (DSPs) can be controlled by and connected to a switching device via an Ethernet network. One or more DSPs connected to the switching device interact with the switching device as separate IP devices, in that each such DSP may have its own separate IP address to which IP packets may be addressed.

16 Claims, 3 Drawing Sheets

MEDIA IDENTIFICATION, CLASSIFICATION, FORWARDING, AND MANAGEMENT FOR VOICE AND VIDEO COMMUNICATIONS

CLAIM OF PRIORITY

This application claims priority under 35 U.S.C. §119 to U.S. Provisional Patent Application No. 61/571,776, filed Jun. 30, 2011, titled "SCALABLE AND SECURE METHODS FOR MEDIA IDENTIFICATION, CLASSIFICATION, FORWARDING AND MANAGEMENT IN DEVICES THAT ENABLE VOICE AND VIDEO COMMUNICATIONS," and the contents of which are incorporated by reference herein in their entirety.

BACKGROUND

Within various electronics communications, there are various forms of networks and transmission types that can carry various forms, and support various sources and targets for analog and digital electronic media, such as analog and digital voice, sound, and video. In particular, there are many different kinds of communication devices from which a call, which can include various forms of data, can originate and just as many different kinds of communication devices that can receive such calls.

Various solutions have been developed to connect communication devices that use different forms of communication standards and protocols. However, many of them suffer from the inability to intelligently scale, or manage secure communications between such disparate devices and protocols without over reliance on computing device processing cycles.

BRIEF SUMMARY OF EMBODIMENTS

A system processes media, such as voice and video, in a scalable and secure manner. The system can process voice and video for a large quantity of users. For example, the system can enable large quantities of simultaneous phone conversations over an IP network. The IP network can carry voice, video, and other data concurrently. The system identifies which packets carry voice data, which packets carry video, and which packets carry other kinds of data. The system scales both with the quantity of users and in terms of network topology. The system may involve multiple digital signal processors (DSPs) which process the packets. Each such DSP may have a separate IP address, and may communicate with other components of the system over IP networks. The DSPs can be programmed via packets sent to those DSPs over IP or Ethernet networks.

Certain embodiments of the present invention are directed toward systems for managing voice and video communication. Such systems may include a CPU, a switch connected to the CPU, and a memory connected to the CPU. The CPU can be configured to execute instructions to receive an incoming signaling message to initiate a requested call, determine details of the requested call, determine a rule identifier based on the details, determine a rule associated with the rule identifier, program a switch to open a port and to route the request call according the rule, receive a signaling message to terminate the requested call, and program the switch to close the ports.

DETAILED DESCRIPTION OF EMBODIMENTS

Embodiments of the invention are directed towards systems, devices, and methods for providing scalable and secure identification, classification, forwarding, and management of media for voice and video communications. One particular embodiment of the invention includes a unified exchange device that can quickly and efficiently route various types of electronic communications, such as voice and video communications, between various types of devices that may or may not use the same type of electronic communication protocol. For example, a user may use an analog phone to call a voice over Internet protocol (VoIP) telephone. For such a communication to be connected between the two types of communication devices, the communication signals, or calls, are translated or routed to devices that can translate the analog signal to a digital signal that can be sent over packet-based networks to the targeted VoIP device. Performing such translations can often times be very processor intensive, and thus inefficient and slow.

In one embodiment of the invention, for each IP packet that enters the system, the system identifies a type of conversation (e.g., voice, video, data, etc.) that the IP packet represents. The system performs this identification in order to apply an appropriate quality-of-service to the IP packet; different types of conversations may have different qualities-of-service applied to them.

Additionally, two users are conducting a conversation with each other through the system disclosed herein may be doing so on different types of communication devices. One such communication device may use different codecs than the codecs used by the other communication device. Audio encoded by one codec may be interpreted differently from audio encoded by another coded. In one embodiment of the invention, the system enabling communication between two communication devices automatically performs transcoding of encoded data so that data encoded using a first codec, of the source communication device, becomes encoded using a second codec, of the recipient communication device, before being forwarded on to the recipient communication device. This transcoding makes it possible for the two communication devices to converse with each other even though they are using different codecs to encode and decode the audio that they send and receive. In order to make this transcoding possible, in one embodiment of the invention, a flow from each user of the system is identified. Packets entering the system are analyzed and assigned to a particular user's flow as a consequence of the analysis.

In one embodiment of the invention, a switching device called a "unified exchange" (which may operate at a higher level than conventional network switches) receives a packet from a user and examines the payload of the packet. The switching device determines whether the packet's payload is encrypted, and, if so, decrypts the payload. The switching device may determine whether the packet indicates that a certain kind of codec was used to encode the payload data, and then employ that codec to decode and process the payload data. Thus, if one party to an audio conversation occurring through the switching device is using a mobile phone, while the other party to the audio conversation is using a public switched telephone network (PSTN) phone, they can still communication with each other. The switching device enables this conversation to occur even though the mobile phone does not use the same audio codecs that the PSTN phone uses to encode and decode audio data. The switching device performs transcoding between audio codecs in order to enable the conversation to occur between such different kinds of communication devices.

According to one embodiment of the invention, the switching device includes a set of Ethernet ports. Communication devices are connected to the switching device via Ethernet cables attached to the Ethernet ports. IP packets travel in and out of the switching device, to and from the connected communication devices, over the cables and through the ports. As the IP packets enter the switching device, the switching device determines the type of traffic (e.g., audio, video, data, etc.) being carried by those packets. The switching device assigns packets to flows based on the characteristics of those packets, e.g., the source and destination IP addresses indicated in the packet headers. The type of transcoding that the switching device performs relative to a particular IP packet's payload may depend on the flow to which that packet is assigned. Each flow may have an associated pair of codecs: a source codec and a destination codec. The source codec may be the codec used by the source communication device (as determined by the source IP address), while the destination codec may be the codec used by the destination communication device (as determined by the destination IP address).

According to an embodiment of the invention, the switching device performs security functions relative to incoming packets in order to ensure that the packets actually do belong to a legitimate conversation being handled by the switching device. The switching device rejects incoming packets that do not belong to any legitimate conversation being handled by the switching device.

According to an embodiment of the invention, the system involves a set of digital signal processors (DSPs) that process (e.g., via transcoding, encryption, or decryption) the payloads of the packets that the switching device handles. In one embodiment, each of these DSPs is modeled after a separate IP network, even though each may (but does not need to) reside within the switching device. The networking subsystem and the DSP subsystem are architected such that they are connected over an IP network. Consequently, packet flows can be forwarded to different IP devices. At a high level, the switching device communicates with its peers (communication devices such as phones) that will be engaging in a conversation. The switching device negotiates the codecs that will be used in the conversation. The switching device defines a flow of IP packets that will be used to carry the conversation data. The switching device also negotiates the ports that will be used and whether encryption and decryption will be conducted relative to the flow. Thereafter, the switching device classifies all communications between the peer and the switching device into a defined flow.

According to one embodiment of the invention, the switching device includes a networking subsystem and a DSP subsystem. Each of these subsystems is connected with a separate IP network internally to the switching device. This connection to a separate IP network allows the DSP subsystem to be placed in various locations in a network. In one embodiment of the invention, each DSP is implemented by a separate hardware card, and the networking subsystem forwards packet flows to a particular hardware card for further digital signal processing by that hardware card.

According to one embodiment of the invention, the hardware-implemented DSPs are located externally to the switching device, and the switching device forwards IP packets externally to a particular DSP over a network based on the flow to which those IP packets belong. Because the DSPs may be located externally to the switching device, the entire system obtains a degree of scalability that otherwise might not have been possible if all of the DSPs had to be located internally within the switching device itself.

In one embodiment of the invention, as an IP packet arrives on an interface of the switching device, the switching device examines the characteristics of the IP packet and determines the flow to which that packet should be assigned. Because each flow is associated with a DSP, the switching device then knows to which DSP the packet should be forwarded for processing. During the establishment of a conversation session (at "call setup time") between two communication devices through the switching device, the switching device negotiates the parameters of the conversation with the communication devices. These parameters may include the source and destination IP addresses and port numbers. The switching device then programs the networking subsystem and the DSP subsystem using these negotiated parameters. The switching device may establish a mapping between a particular conversion session's flow and a pair of source and destination DSPs that will be performing the processing on the data being carried on that flow.

According to one embodiment of the invention, for security purposes, the switching device only forwards, to a particular DSP, packets belonging to a flow that has been mapped to that DSP via the processes discussed above. As a result, the DSP only receives and processes packets from legitimately established flows. This prevents each DSP from becoming flooded with packets on which that DSP does not need to perform any processing.

As is discussed above, each DSP may perform encoding and decoding as part of the processing it performs. This processing may involve the encoding of analog voice data from a phone into digital IP packet data that can be transported over an IP network. This processing also may involve the decoding of digital IP packet data into analog voice data that a phone can present through its speaker. This processing also may involve encrypting unencrypted data from a communication device for transport through an IP network. This processing also may involve decrypting encrypted data transported through an IP network for delivery to a communication device. By encrypting data prior to transporting that data through the IP network, a DSP ensures that the data will be secure so that unauthorized parties cannot eavesdrop on conversations.

In one embodiment of the invention, each DSP also may perform dual-tone multi-frequency (DTMF) generation and dial tone detection. In one embodiment of the invention, each DSP also may perform modulation/demodulation (modem) functionality. In one embodiment of the invention, each DSP also may perform fax functionality.

According to an embodiment of the invention, multiple DSPs are controlled and connected together in an Ethernet network in a novel manner. In one embodiment of the invention, one or more DSPs connected to the switching device interact with the switching device as separate IP devices, in that each such DSP may have its own separate IP address to which IP packets may be addressed. As is discussed above, DSPs may be situated externally to the switching device, and may be communicatively connected to the switching device via Ethernet and IP networks. These external DSPs may perform the functions described above for and on behalf of the switching device. In certain embodiments of the invention, the switching device does not perform any of the functions that are performed by the external DSPs, and, indeed, may entirely lack the hardware and software structures used to perform those functions. However, in an alternative embodiment of the invention, one or more DSPs may be situated within the switching device. Even in embodiments in which DSPs are situated within the switching device, the DSPs still may have their own separate IP addresses and may be interconnected via IP networks, which may be incorporated within the switching device itself.

In one embodiment of the invention, the switching device controls and programs the external DSPs by sending IP packets over IP networks to the external DSPs. In this manner, the switching device can negotiate communication session parameters with the externals DSPs and cause the external DSPs to encrypt, decrypt, encode, decode, and otherwise process IP packet payload data as needed in a particular communication session. In one embodiment of the invention, instead of sending processed data on toward a destination communication device (e.g., a mobile phone) after processing that data, a DSP forwards the processed data back to the switching device so that the switching device can then forward the processed data on toward the destination communication device.

In one embodiment of the invention, the switching device programs both a networking subsystem and a DSP subsystem with the same parameters to identify separate packet flows between different sets of users and those user's communication devices (e.g., IP phones). Such parameters may include the TCP/UDP ports and IP addresses of the communication devices, for example. Such parameters may indicate the codecs that each DSP is to use to process data belonging to a particular flow. As a consequence of the programming of the networking subsystem with the parameters and with mapping between DSPs, the networking subsystem is thereafter enabled to identify a flow to which an incoming IP packet belongs and to forward that IP packet to the appropriate DSP associated with that flow. As a consequence of the programming of the DSP subsystem, the DSP subsystem is enabled to reach the networking subsystem. The programming instructs each DSP as to how the DSP is to process packets belonging to a particular flow.

According to one embodiment of the invention, after a main processor of the switching device has programmed the networking and DSP subsystems as discussed above, the main processor of the switching device is then "out of the loop" with respect to the conversation session that the switching device has established via the programming. As a consequence of the programming of the subsystems, the main processor does not need to be involved in the routing of IP packets from source to destination; the programmed elements can handle the addressing and delivery on their own without intervention from the switching device's main processor. After a communication session (or "call") has been established, data exchanged in the communication session can completely bypass the main processor. This beneficially reduces the load and burden on the switching device's main processor, furthering scalability. The networking subsystem may comprise a Layer 7 Switch. The programmed networking subsystem performs "policy-based" routing.

According to one embodiment of the invention, during the negotiations between the switching device and the DSPs that occur during the establishment of a communication session, the DSPs negotiate whether encryption will be used in the session. If the DSPs determine that encryption is to be used in the session, then the DSPs exchange encryption keying information as a part of the negotiation. The DSPs may thereafter use this keying information to encrypt and decrypt data contained within IP packets that belong to the session's flow. The DSPs also may inform each other, during the negotiation phase, as to which encryption algorithms will be used for the session.

Figure 1:
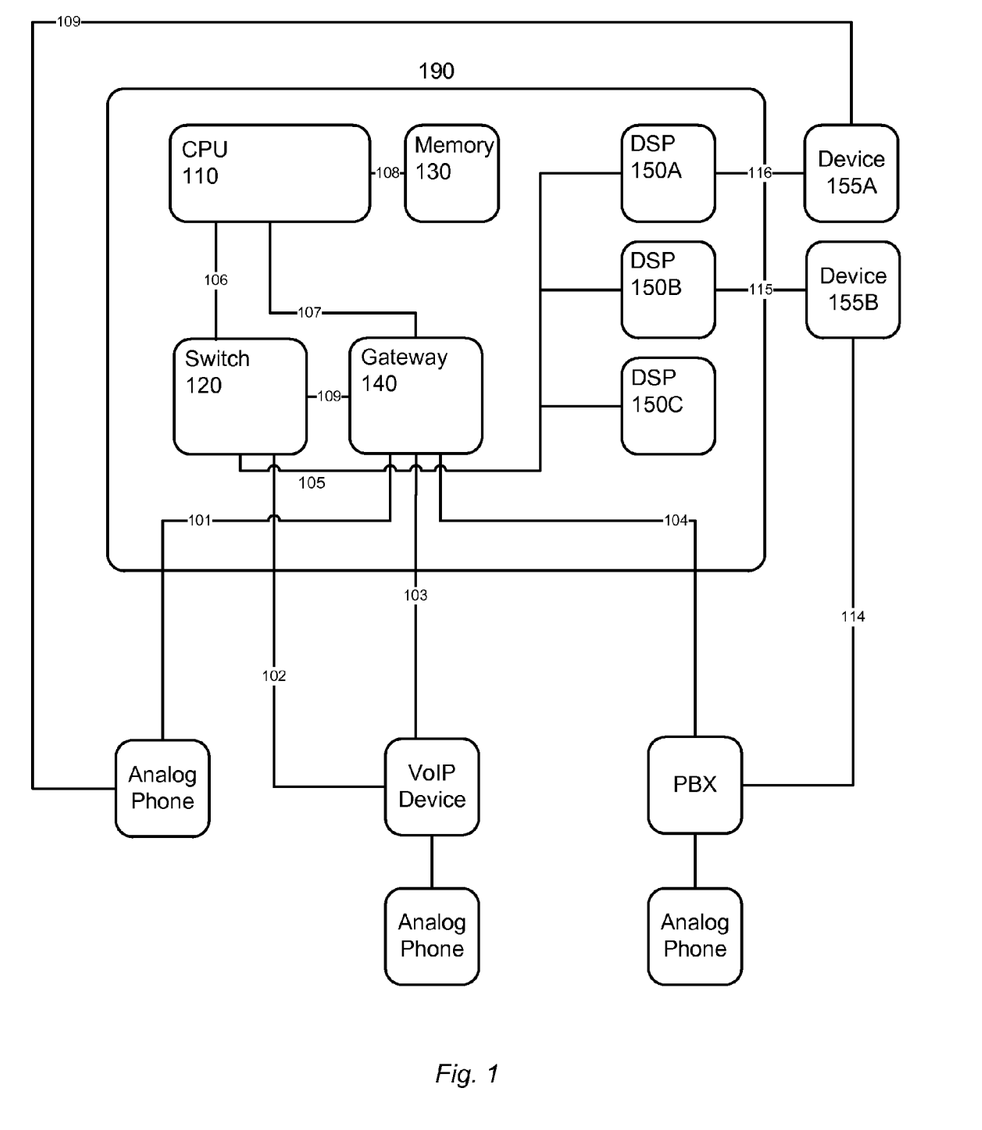
FIG. 1 is a block diagram illustrating a system for managing electronic voice and video communications between various communication devices using various communication protocols, according to an embodiment of the invention.

FIG. 1 is a block diagram illustrating a system 100 that can identify, classify, forward, and manage communication between various types of electronic communication devices, according to various embodiments of the invention. Central to system 100 is a unified exchange device 190—the switching device discussed above. As shown, unified exchange device 190 can include a number of components that can be implemented in various combinations of hardware, firmware, and software. For example, unified exchange device 190 can include a CPU 110, connected to a switch 120, a gateway 140, and a memory 130, over connections 106, 107, and 108. CPU 110 can use connections 106, 107, and 108 to send and receive data and control and command signals to and from the respective components. For example, CPU 110 can retrieve various instructions, such as software, as well as access tables of rules and policies identified by various rule and policy identifiers associated with various types of incoming request and calls. Similarly, CPU 110 can communicate with switch 120 to send commands to switch 120 that will program the switch to automatically relay messages received from outside the communication device or internal gateway 140. Gateway 140 can relay signaling messages from various external communication devices. CPU 110 can use such signaling messages to identify rules and policies with which to program switch 120.

Unified exchange device 190 can also include a number of digital signal processor (DSP) units such as DSP 150A, DSP 150B, and DSP 150C. DSP units DSP 150A, DSP 150B, and DSP 150C include any number and type of digital signal processors specifically designed for applications that typically require a large number of mathematical operations to be performed quickly and repetitively on large sets of data. A typical DSP can accept an analog signal, convert the analog signal to a digital signal, perform operations on the digital signal and then translate that processed digital signal back to an analog signal or send the processed digital signal out to other devices. In an embodiment of the invention, DSPs 150A-C are used to translate communication protocols between one device and another device to complete the requested call. In certain embodiments of the invention, as is discussed above, DSPs 150A-C are located externally to unified exchange device 190, have their own separate IP addresses, and communicate with unified exchange device 190 over IP networks that connect DSPs 150A-C to unified exchange device 190 (e.g., via Ethernet ports of unified exchange device 190).

As mentioned above, unified exchange device 190 can include any number of DSPs, thus making various embodiments of the present invention highly scalable according to the needs of a particular user or entity operating unified exchange device 190. In some embodiments, it is desirable to also increase the speed of CPU 100, the size of memory 130, and/or the performance of switch 120 when increasing the number of DSPs in unified exchange device 190 to increase the throughput of device 190 and the number of simultaneous calls device 190 can handle at any given time.

System 100 can also include various numbers of analog phones, VoIP devices, and PBXs. In such systems, analog phones, VoIP devices and PBXs can be directly connected to unified exchange device 190 at one location. Each one of the communication devices can then request a call to other remote and local communication devices. For example, an analog phone connected to unified exchange device 190 can initiate a call by sending a signaling message over connection 101 to gateway 140, which can pass on the details of the requested call to CPU 110 over connection 107. In some embodiments, the analog phone can be connected directly to the CPU to send signaling messages without the need for gateway 140. In either case, CPU 110 can determine various details about the requested call in the analog phone's native signal message format. The details about the requested call can include details such as the identity and type of the target device, which can be analog or digital, as well as information about the originating analog phone, such as the telephone number associated with that phone.

CPU 110 can then use details about the requested call received from the analog phone to determine appropriate rules and policies with which to program switch 120, and possibly gateway 140, to complete the call between the analog phone and the target device. For example, from the requested call indicated in the signaling message received from the analog phone, CPU 110 can determine that the analog phone is attempting to contact a VoIP telephone located at a remote location. CPU 110 can use the details of the requested call to determine or generate the rules or policy identifier. Such an identifier can be a unique string or file of information based on the requested call details. CPU 110 can then use the rules or policy identifier to retrieve or generate the rules or policies with which to program switch 120 to automatically handle the routing of the call.

The rules or policies determined by CPU 110 can include various translation requirements, speed, and/or quality of service, as well as preferences for DSPs that can handle or have the bandwidth capacity to process the call between the analog phone and the target VoIP telephone. Advantages of having a unique rules or policy identifier include the ability to change human-readable information. Such information that can be used for billing, management, and other administrative tasks associated with the operation of unified exchange device 190. In addition, unique rules or a policy identifier generated based on a particular request provides the opportunity to store customizable or configurable rules and policies in a table format that CPU 110 can reference. Such rules or policy tables allow users to customize and configure unified exchange device 190 to their own particular needs and specifications.

In some embodiments, unified exchange device 190 can also be connected to a VoIP device over connection 102 or connection 103. As shown, the VoIP device can communicate using Internet protocol (IP) over connection 102 with switch 120. In some embodiments, IP connection 102 is the only connection required for the VoIP device to send signaling and call information to unified exchange device 190. However, in other embodiments, the VoIP device can also be connected to unified exchange device 190 over connection 103 to gateway 140 in order to send signaling messages to CPU 110 regarding the desired call. As discussed above in reference to the analog phone, CPU 110 can use a signaling message from the VoIP device to determine various rules and policies based on the details of the requested call to program switch 120 to automatically set up and handle the requested call from the VoIP device.

As with the scenario discussed above in reference to the analog phone, switch 120 can open up an appropriate number of ports through which to route a call from the VoIP device to the appropriate or specified DSP according to the rules and policies that CPU 110 programs switch 120 to use.

At the end of the call, the VoIP device can send a termination signaling message to CPU 110 to end the call session. The end of the session signaling message can trigger CPU 110 to reprogram switch 120 to close all of the open ports that had been opened to route the requested call. By closing the unused ports in switch 120, embodiments of the present invention provide the advantage of protecting the various components of unified exchange device 190 from unwanted data packets entering the device. This provides a level of security from potential hackers attempting to gain access to components of unified exchange device 190 or communication sessions, as well as from intercepting information from the communication sessions or calls being handled by the device.

Additional security, according to various embodiments of the invention, can be provided by the programming of switch 120. According to the rules determined by CPU 110, switch 120 can be programmed or set up to reject any incoming signals or data packets that do not correspond exactly with the details determined from the requested call. For example, communications from the VoIP device can indicate the originating IP address, content type, and destination address for another VoIP device. Any communication, signal or packet received by switch 120 that does not correspond exactly to the details indicated in the requested call can be rejected to prevent a hacker from intercepting inter-device communications.

Various embodiments of the invention can also include connecting a PBX to unified exchange device 190. In such embodiments, the PBX device can be connected to unified exchange device 190 using gateway 140 or a time-division multiplexing (TDM) bus (not shown) for the purpose of sending signaling messages to initiate a call from the PBX to CPU 110. In other embodiments, a PBX can be outfitted with a translator to send signaling messages directly to CPU 110, and thus omit gateway 140. In other embodiments, the data coming from the PBX can be sent over connection 104 in the form of an ISDN connection. While the ISDN connection may not be compatible with switch 120, gateway 140 can translate the ISDN signals for switch 120 to route the requested call from the PBX to the requested recipient based on the rules and policies determined by CPU 110 as discussed above in reference to the analog phone and the VoIP device.

In various embodiments, if the incoming call is natively in IP communication protocols, then that call can go directly to switch 120 and can then be routed to the appropriate DSP according to the rules or policies determined from the details of the requested call. However, if the incoming requested call is not in an IP format, one or more components of unified exchange device 190, such as gateway 140, can translate the incoming signal from the incoming non-IP format into an IP format, such as Ethernet, and send the translated signal to switch 120 for further routing to a DSP. In other embodiments, system 100 or unified exchange device 190 can include additional translation devices 155A and 155B. In such embodiments, analog phones and analog PBXs can connect to external devices directly. The external devices can translate the incoming call data and send the translated data to an appropriate DSP for further processing or routing.

In some embodiments, CPU 110 is capable of processing multiple incoming signaling messages from various types of communication devices simultaneously. In such embodiments, CPU 110 can determine, identify, or retrieve rules or policy identifiers based on each of the incoming call requests. Similarly, CPU 110 can handle the re-programming of switch 120 using bulk or batches of instructions to program switch 120 based on the rules or policies associated with the determined rules or policy identifiers. In such embodiments, unified exchange device 190 can quickly and efficiently handle the reconfiguring of switch 120 and thus handle a large number of calls simultaneously.

In some embodiments, it is possible for the user using one device to transfer the call to another user using any other device. In such embodiments, CPU 110 can receive a signaling message during the middle of an ongoing requested call in order to determine updated requested call details. CPU 110 can then use the updated requested call details to determine new rules or policies with which to program switch 120 to reroute the ongoing call from the original communication device to the transferred communication device. Such embodiments enable the ability to maintain multiple rules and policies per call. In such embodiments, it is also possible to redirect the call to a different DSP if the CPU 110 detects that or is informed that the type of media in the call has changed.

Figure 2:
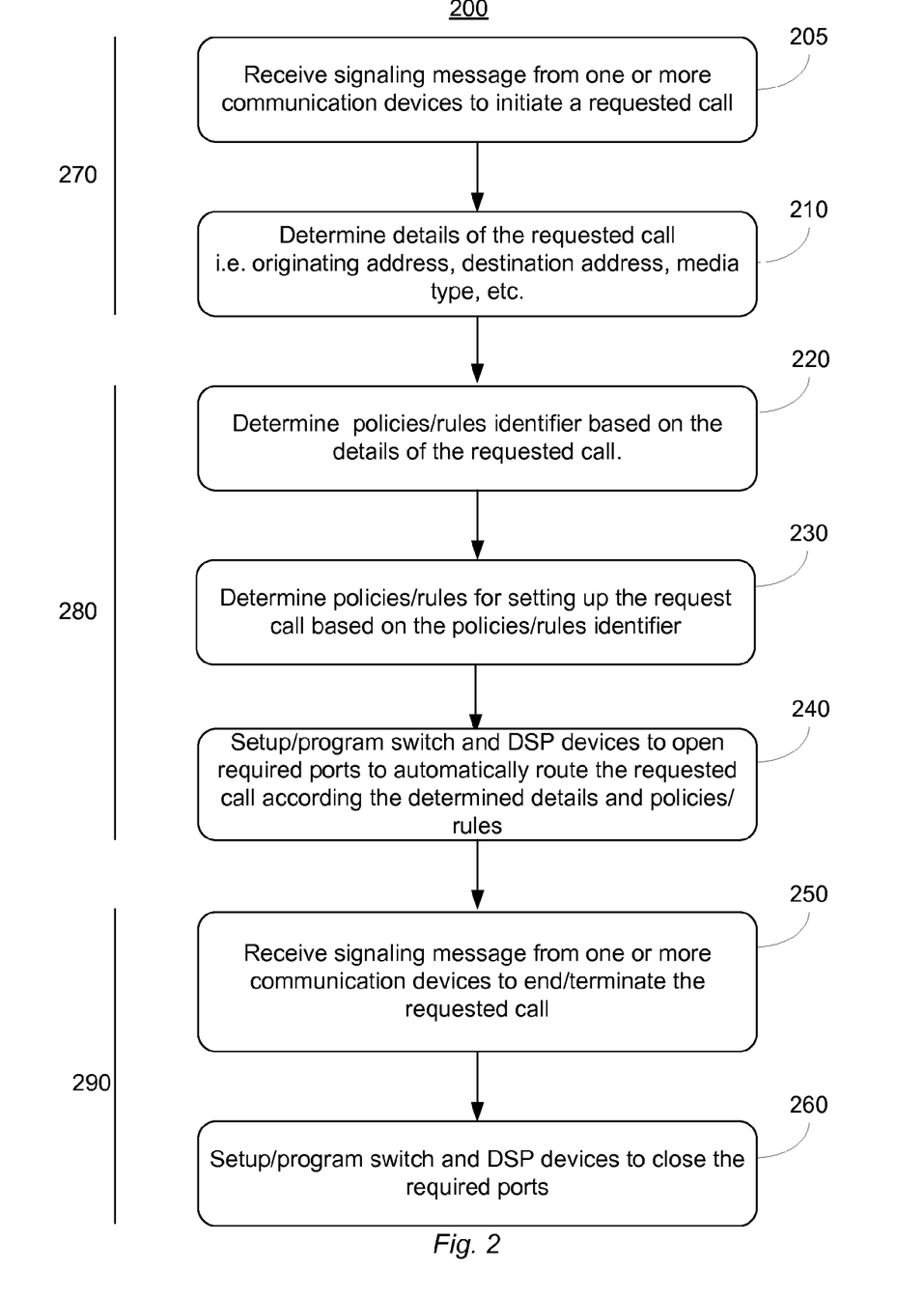
FIG. 2 is a flow diagram illustrating a technique for managing communication between communication devices that use various communication protocols, according to an embodiment of the present invention.

FIG. 2 is a flow diagram illustrating a technique 200 according to various embodiments. The technique shown is split into three phases: initiating signaling phase 270, call setup phase 280, and terminating signaling phase 290.

In initiating signaling phase 270, and more specifically in step 205, CPU 110 can receive a signaling message from one or more communication devices to initiate a requested call. CPU 110 can then determine the details of the requested call, such as the originating address, destination address, the media type, and other details specific to the requested call in step 210.

In call setup phase 280, and more specifically in step 220, once the details of the requested call our determined, CPU 110 can determine one or more rules or policy identifiers. In step 230, CPU 110 can determine rules or policies for setting up the requested call, such as by programming or setting the switch 120, based on the rules or policy identifiers. To do so, in some embodiments, CPU 110 can reference a rule or policy table and select the rules or policies that are associated with the rule or policy identifiers. Once CPU 110 determines the rules or policies, CPU 110 can set up or program switch 120 and DSP devices 150A-C to open up the required ports to automatically route the requested call according to the details and/or the rules or policies, in step 240.

In step 250, CPU 110 can receive a signaling message from one or more of the communication devices, e.g., either the originating or the target communication device, to end or otherwise terminate the requested call. CPU 110 can then set up or program switch 120 and DSP devices 150A-C to close the required ports in step 260.

Figure 3:
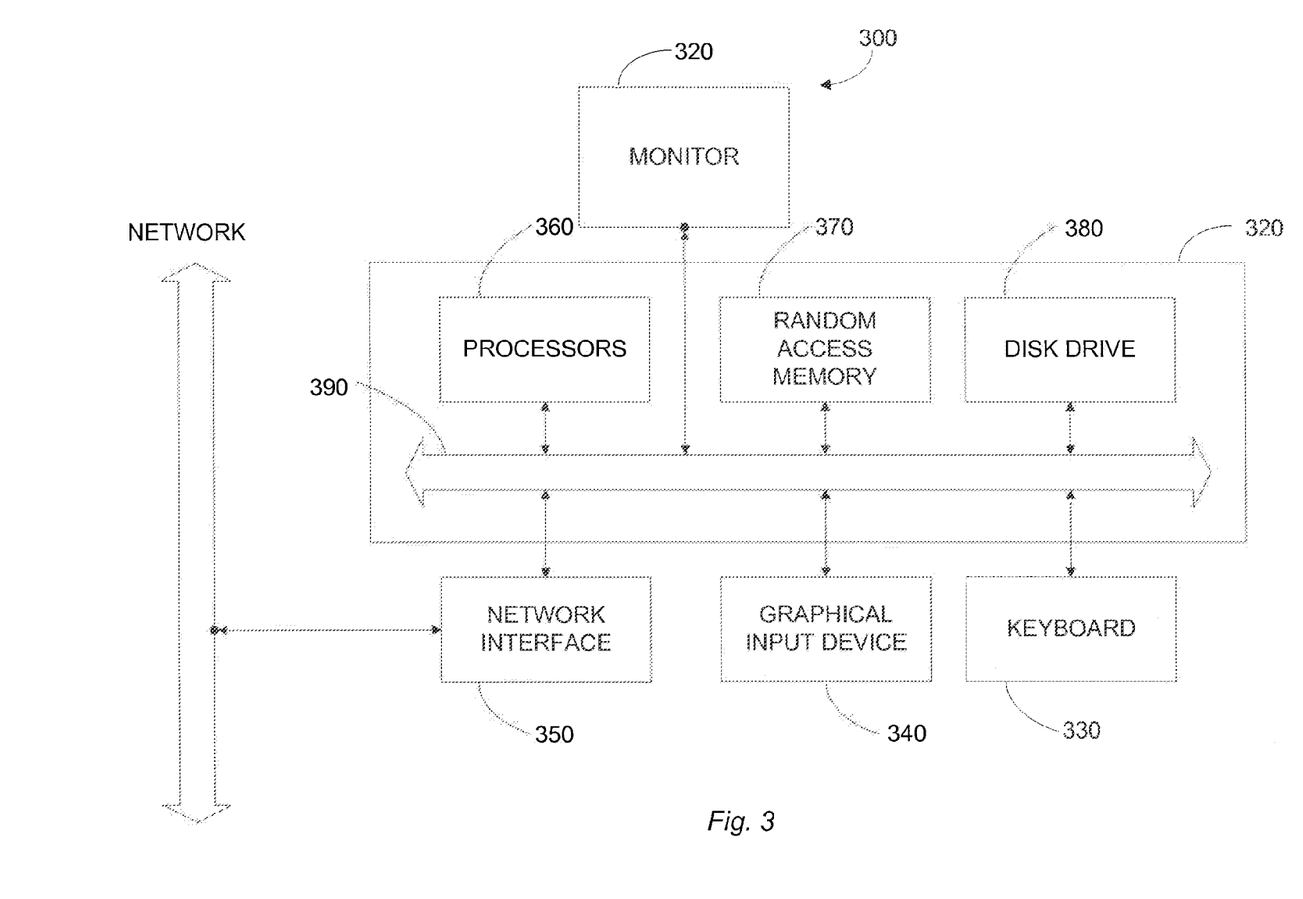
FIG. 3 is block diagram illustrating a system that can be used to implement various embodiments of the invention.

FIG. 3 is a block diagram that illustrates a computer system 300 usable in whole or in part to implement various embodiments of the present invention. For example, computer system 300 can be used to implement any or all of the various components of unified exchange device 190. Similarly, computer system 300 can be used to implement or mimic the functions of the analog phone, the VoIP device, or the PBX.

Computer system 300 typically includes a display 310, computer 320, a keyboard 330, a user input device 340, computer interfaces 350, and the like.

In various embodiments, display (monitor) 310 may be embodied as a CRT display, an LCD display, a plasma display, a direct-projection or rear-projection DLP, a microdisplay, or the like. In various embodiments, display 310 may be used to visually display user interfaces, images, or the like.

In various embodiments, user input device 340 is typically embodied as a computer mouse, a trackball, a track pad, a joystick, wireless remote, drawing tablet, voice command system, eye tracking system, and the like. User input device 340 typically allows a user to select objects, icons, text and the like that appear on the display 310 via a command such as a click of a button or the like.

Embodiments of computer interfaces 350 typically include an Ethernet card, a modem (telephone, satellite, cable, ISDN), (asynchronous) digital subscriber line (DSL) unit, FireWire interface, USB interface, and the like. For example, computer interfaces 350 may be coupled to a computer network, to a FireWire bus, or the like. In other embodiments, computer interfaces 350 may be physically integrated on the motherboard of computer 320, may be a software program, such as soft DSL, or the like.

In various embodiments, computer 320 typically includes familiar computer components such as a processor 360, and memory storage devices, such as a random access memory (RAM) 370, disk drives 380, and system bus 390 interconnecting the components discussed above.

In some embodiments, computer 320 includes one or more Xeon microprocessors from Intel. Further, in one embodiment, computer 320 includes a UNIX-based operating system.

RAM 370 and disk drive 380 are examples of non-transitory computer-readable tangible storage media configured to store data such including computer-executable computer code or the like. Types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like. Embodiments of the invention include such non-transitory computer-readable storage media storing instructions for causing processors to perform the techniques described herein.

In one embodiment, computer system 300 may also include software that enables communications over a network using protocols such as the HTTP and TCP/IP protocols, and the like. In alternative embodiments of the present invention, other communications software and transfer protocols may also be used, such as, for example, IPX, UDP, or the like.

It will be readily apparent to one of ordinary skill in the art that many other hardware and software configurations are suitable for use with embodiments of invention. For example, the computer may be a desktop, portable, rack-mounted, or tablet configuration. Additionally, the computer may be a series of networked computers. Further, the use of other microprocessors are contemplated, such as Core™ microprocessors from Intel; Phenom™, Turion™ 64, Opteron™ or Athlon™ microprocessors from Advanced Micro Devices, Inc; and the like. Further, other types of operating systems are contemplated, such as WindowsVista®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In the description herein, a recitation of "a," "an," or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the spirit or scope of the disclosure.

What is claimed is:

1. A method comprising:
   receiving, over a first network, at a switching device having a first Internet Protocol (IP) address, an IP data packet that was processed by a first digital signal processor (DSP) that has a second IP address that differs from the first IP address;

determining, at the switching device, a destination to which the IP data packet is to be delivered;

sending the IP data packet from the switching device over a second network to a second DSP that is mapped to the destination and that has a third IP address that differs from the first and second IP addresses;

receiving, at the switching device, from the first DSP, a request to establish a communication session with the second DSP;

negotiating, in response to the request, communication session parameters with the first DSP and the second DSP; and storing, at the switching device, a mapping that maps a particular packet flow to the first DSP and the second DSP said mapping indicating that the negotiated communication session parameters are to be used for IP packets belonging to the particular packet flow.

2. The method of claim 1, wherein the IP packet contains data that was encrypted by the first DSP, and wherein the IP packet contains data that the second DSP can decrypt.

3. The method of claim 1, wherein the IP packet contains data that was decoded by the first DSP using a first codec, and wherein the IP packet contains data that the second DSP can encode using a second codec that differs from the first codec.

4. The method of claim 1, wherein the IP packet contains digital data that the first DSP encoded from audio signals received from a first phone, and wherein the IP packet contains digital data that the second DSP can decode into audio signals that can be presented through a speaker of a second phone that is separate from the first phone.

5. A method comprising:

receiving, over a first network, at a switching device having a first Internet Protocol (IP) address, an IP data packet that was processed by a first digital signal processor (DSP) that has a second IP address that differs from the first IP address;

determining, at the switching device, a destination to which the IP data packet is to be delivered;

sending the IP data packet from the switching device over a second network to a second DSP that is mapped to the destination and that has a third IP address that differs from the first and second IP addresses;

receiving, at the switching device, a second IP packet that is addressed to the second DSP;

determining, at the switching device, based on characteristics of the second IP packet and mapping data stored at the switching device, whether the second IP packet belongs to a flow that is mapped to the second DSP; and preventing, in response to determining that the second IP packet does not belong to any flow that is mapped to the second DSP, the second IP packet from being forwarded to the second DSP from the switching device.

6. A network device having a first Internet Protocol (IP) address, the network device comprising:

means for receiving, over a first network, an IP data packet that was processed by a first digital signal processor (DSP) that has a second IP address that differs from the first IP address;

means for determining a destination to which the IP data packet is to be delivered;

means for sending the IP data packet over a second network to a second DSP that is mapped to the destination and that has a third IP address that differs from the first and second IP addresses;

means for receiving, from the first DSP, a request to establish a communication session with the second DSP;

means for negotiating communication session parameters with the first DSP and the second DSP in response to the request; and means for storing a mapping that maps a particular packet flow to the first DSP and the second DSP said mapping indicating that the negotiated communication session parameters are to be used for IP packets belonging to the particular packet flow.

7. The network device of claim 6, wherein the IP packet contains data that was encrypted by the first DSP, and wherein the IP packet contains data that the second DSP can decrypt.

8. The network device of claim 6, wherein the IP packet contains data that was decoded by the first DSP using a first codec, and wherein the IP packet contains data that the second DSP can encode using a second codec that differs from the first codec.

9. The network device of claim 6, wherein the IP packet contains digital data that the first DSP encoded from audio signals received from a first phone, and wherein the IP packet contains digital data that the second DSP can decode into audio signals that can be presented through a speaker of a second phone that is separate from the first phone.

10. A network device having a first Internet Protocol (IP) address, the network device comprising:

means for receiving, over a first network, an IP data packet that was processed by a first digital processor (DSP) that has a second IP address that differs from the first IP address;

means for determining a destination to which the IP data packet is to be delivered;

means for sending the IP data packet over a second network to a second DSP that is mapped to the destination and that has a third IP address that differs from the first and second IP addresses;

means for receiving a second IP packet that is addressed to the second DSP;

means for determining, based on characteristics of the second IP packet and mapping data stored at the network device, whether the second IP packet belongs to a flow that is mapped to the second DSP; and means for preventing the second IP packet from being forwarded to the second DSP in response to determining that the second IP packet does not belong to any flow that is mapped to the second DSP.

11. A non-transitory computer-readable storage medium storing instructions which, when executed by one or more processors, cause the one or more processors to perform steps comprising:

receiving, over a first network, at a switching device having a first Internet Protocol (IP) address, an IP data packet that was processed by a first digital signal processor (DSP) that has a second IP address that differs from the first IP address;

determining, at the switching device, a destination to which the IP data packet is to be delivered;

sending the IP data packet from the switching device over a second network to a second DSP that is mapped to the destination and that has a third IP address that differs from the first and second IP addresses;

receiving, at the switching device, from the first DSP, a request to establish a communication session with the second DSP;

negotiating, in response to the request, communication session parameters with the first DSP and the second DSP;

and storing, at the switching device, a mapping that maps a particular packet flow to the first DSP and the second DSP said mapping indicating that the negotiated communication session parameters are to be used for IP packets belonging to the particular packet flow.

12. The non-transitory computer-readable storage medium of claim 11, wherein the IP packet contains data that was encrypted by the first DSP, and wherein the IP packet contains data that the second DSP can decrypt.

13. The non-transitory computer-readable storage medium of claim 11, wherein the IP packet contains data that was decoded by the first DSP using a first codec, and wherein the IP packet contains data that the second DSP can encode using a second codec that differs from the first codec.

14. The non-transitory computer-readable storage medium of claim 11, wherein the IP packet contains digital data that the first DSP encoded from audio signals received from a first phone, and wherein the IP packet contains digital data that the second DSP can decode into audio signals that can be presented through a speaker of a second phone that is separate from the first phone.

15. The non-transitory computer-readable storage medium of claim 11, wherein the steps further comprise: sending, from the switching device to the first DSP, one or more IP packets that specify control commands which cause the first DSP to be programmed according to a set of parameters; and sending, from the switching device to the second DSP, one or more IP packets that specify control commands which cause the second DSP to be programmed according to the set of parameters.

16. A non-transitory computer-readable storage medium storing instructions which, when executed by one or more processors, cause the one or more processors to perform steps comprising:
   receiving, over a first network, at a switching device having a first Internet Protocol (IP) address, an IP data packet that was processed by a first digital signal processor (DSP) that has a second IP address that differs from the first IP address;
   determining, at the switching device, a destination to which the IP data packet is to be delivered;
   sending the IP data packet from the switching device over a second network to a second DSP that is mapped to the destination and that has a third IP address that differs from the first and second IP addresses;
   receiving, at the switching device, a second IP packet that is addressed to the second DSP;
   determining, at the switching device, based on characteristics of the second IP packet and mapping data stored at the switching device, whether the second IP packet belongs to a flow that is mapped to the second DSP; and
   preventing, in response to determining that the second IP packet does not belong to any flow that is mapped to the second DSP, the second IP packet from being forwarded to the second DSP from the switching device.

* * * * *